US005782610A

United States Patent [19]

Ikeda

[11] Patent Number: 5,782,610

[45] Date of Patent: Jul. 21, 1998

[54] METHOD OF STOPPING SCROLL COMPRESSOR THAT IS DRIVEN BY 3-PHASE DC MOTOR

[75] Inventor: Hideo Ikeda, Isesaki, Japan

[73] Assignee: Sanden Corp., Isesaki, Japan

[21] Appl. No.: 757,449

[22] Filed: Nov. 27, 1996

[30] Foreign Application Priority Data

Dec. 7, 1995 [JP] Japan .................... 7-318787

[51] Int. Cl.$^{6}$ .................... F04B 49/06

[52] U.S. Cl. .................... 417/53; 417/45; 318/254; 318/379

[58] Field of Search .................... 417/53, 45

[56] References Cited

U.S. PATENT DOCUMENTS

| | | | |
|---|---|---|---|
| 4,319,171 | 3/1982 | Motoori | 318/379 |
| 4,633,151 | 12/1986 | Crook | 318/254 |
| 4,808,078 | 2/1989 | Havens et al. | 417/45 |
| 5,006,045 | 4/1991 | Shimoda et al. | 417/42 |
| 5,640,073 | 6/1997 | Ikeda et al. | 318/254 |

*Primary Examiner*—Charles G. Freay
*Assistant Examiner*—Cheryl J. Tyler
*Attorney, Agent, or Firm*—Kenjiro Hidaka

[57] ABSTRACT

A method of stopping a scroll compressor that is driven by a 3-phase dc motor having 3-phase exciter windings is provided. The motor is energized by a 3-phase dc power that is produced from a dc power source through an electronic switching circuit. The switching circuit has three pairs of bridge-connected switching transistors whose switchings are individually controlled by a switching controller. One of each pair of the switching transistors belongs to a first transistor group that is connected to a positive terminal of the dc power source and the other belongs to a second transistor group that is connected to a negative terminal of the dc power source. The stopping method comprises the steps of simultaneously turning off all of the three pairs of the switching transistors so as to shut off the 3-phase dc power provided to the motor, maintaining all of the three pairs of the switching transistors in the off state for a first time period that is less than one second, simultaneously turning on the switching transistors of the second group at the end of the first time period so that all terminals of the 3-phase exciter windings are short-circuited with one another, and maintaining the switching transistors of the second group for a second time period that is greater than three seconds while the switching transistors of the first group are still in the off state.

3 Claims, 4 Drawing Sheets

13a
13b
13
11
123
12
122
121
15
DW+
DW−
TrW+
TrW−
Tw
DV+
DV−
TrV+
TrV−
Tv
DU+
DU−
TrU+
TrU−
Tu
14
SWITCHING CONTROLLER
C
Pp
Pn
VM

E1
E2
1sec.
Iψ
N
Nco
E2B
E2A
S
t

METHOD OF STOPPING SCROLL COMPRESSOR THAT IS DRIVEN BY 3-PHASE DC MOTOR

BACKGROUND OF THE INVENTION

1. Field of the Invention

This invention relates to a method of stopping a scroll compressor that is driven by a 3-phase brushless dc motor having 3-phase exciter windings.

2. Description of the Prior Art

In a scroll compressor, the compression takes place between two spiral-shaped scrolls. One of the scrolls is stationary and the other operates with an orbiting motion within the stationary scroll. The orbiting movement of the orbiting scroll draws fluid into a pocket between the two scrolls. As the orbiting motion continues, the fluid opening is sealed off and the fluid is forced into a smaller pocket at the center. The scroll compressor provides high efficiency because: it requires no valves, consequently no valve compression losses; suction and discharge locations are separate from each other, which reduces heat transfer between suction and discharge fluids; and there is no clearance volume providing reexpansion fluid as in a reciprocating compressor.

A scroll compressor that is driven by a 3-phase brushless dc motor per se is a widely known prior art. A typical application of such compressor is an air-conditioning system for a vehicle where only dc power is available. In this application, a refrigerant gas is compressed by the scroll compressor in the air-conditioning system. The compressor motor is driven on a dc power through a switching circuit that electronically commutates a single-phase dc power to produce 3-phase dc power to energize 3-phase stator windings of the motor in a given order. The timings for energizing the stator windings are primarily determined by angular positions of the rotor that are electronically detected from the back emf voltages across the stator windings induced by a revolving permanent-magnet rotor without utilizing any physical angular position sensor.

Since the scroll compressor lacks check valves, when the operation of the scroll compressor is stopped the discharged high pressure gas tends to backflow into the compressor and force the orbiting scroll to make a reverse revolution because of a substantial inlet-outlet pressure difference. The backflowing high pressure gas and the orbiting scroll in reverse revolution generate substantial acoustic noise. It is, therefore, positively desired that the orbiting scroll not be forced to make a reverse revolution when the operation of the compressor is stopped.

One of the stopping methods of scroll compressor, in which the orbiting scroll is prevented from making a reverse revolution, is described in laid-open Japanese patent application, 2-215981, laid-opened Aug. 28, 1990, that is assigned to the assignee of the present application.

FIG. 4 shows a scroll compressor and a driving apparatus therefor as disclosed in the above mentioned Japanese application.

As shown in FIG. 4, a scroll compressor 11 disclosed in the Japanese application includes a compression mechanism 13 and a brushless dc motor 12 having Y-connected 3-phase stator windings 121, 122, 123 and a permanent-magnet rotor (not shown). The compression mechanism 13 contains a stationary scroll and an orbiting scroll that is operatively connected with the rotor of the motor 12. The driving apparatus for the motor 12 includes a line switching circuit 16 and a driving device 17. The driving device 17 provides 3-phase dc drive currents to the 3-phase stator windings 121, 122, 123 in a given order by way of the line switching circuit 16 so that the orbiting scroll in the compression mechanism 13 is driven by the motor 12 to make an orbital motion.

The line switching circuit 16 includes three switches 16*a*, 16*b*, 16*c* so that the stator windings 121, 122, 123 are individually connected with the driving device 17 by way of the switches 16*a*, 16*b*, 16*c*, respectively. The switch 16*a* has contacts A and B, the switch 16*b* has contacts C, D and E, and the switch 16*c* has contacts F, G and H. The contacts A and C, and contacts D and F are respectively electrically connected with each other.

When the operation of the compressor 11 is to be stopped, all of the 3-phase power supply from the driving device 17 to the stator windings 121, 122, 123 will be shut off so as to stop the motor rotor and the orbiting scroll operatively connected therewith. On the other hand, there exists a substantial difference in pressure between the suction and discharged gases of the compressor 11. This inlet-outlet gas pressure difference causes the discharged high pressure gas to backflow into the compressor 11, and this backflowing gas causes the orbiting scroll to make a reverse revolution, as soon as the power to the motor 12 is turned off. As mentioned above, the backflowing high pressure gas and the reverse revolving orbiting scroll together generate substantial acoustic noise. The line switching circuit 16 is provided in order to prevent the orbiting scroll from making reverse revolution.

When the compressor 11 is being driven by the motor 12, the windings 121, 122, 123 are energized in order by driving device 17 through the line switching circuit 16. At the moment the 3-phase power supply from the driving device 17 is shut off in order to stop the operation of the compressor 11, all of the switches 16*a*, 16*b* and 16*c* will be opened and, at the same time, the contacts C and D, and contacts F and G are respectively short-circuited with each other, as shown in dotted lines in FIG. 4, so that all of the terminals A, D, G of the stator windings 121, 122, 123, respectively, are short-circuited with one another.

When the orbiting scroll of the compressor 11 makes a reverse revolution, the motor rotor, operatively connected therewith, will also make a reverse rotation. Then, back emf will be generated in each of stator windings as the permanent-magnet rotor makes a reverse rotation. Since the terminals of the stator windings 121, 122, 123 are short-circuited one another, the currents produced by the back emf will flow in the closed-loop stator windings, and the magnetic flux generated by the currents will cause the rotor to rotate in the normal rotating direction, i.e. the opposite rotating direction. In other words, the closed-loop stator windings will always provide a braking effect to the rotor whichever direction the rotor may rotate. Since the orbiting scroll is operatively connected with the rotor, the orbiting scroll will receive the braking effect as well. Thus, the orbiting scroll will be prevented from making a reverse revolution and generation of the noise caused by the reverse revolution of the orbiting scroll will also be prevented by short-circuiting the terminals of the stator windings when the compressor 11 is stopped.

(Problems pertaining to the conventional stopping method which will be solved by the present invention)

In the above described prior art case, a separate line switching circuit 16 is used in order to short-circuit the stator winding terminals.

Other prior known method of short-circuiting the stator winding terminals involves only an electronic switching circuit. By using such an electronic switching circuit, an additional and separate line switching circuit, such as the one shown in FIG. 4, can be eliminated. The electronic switching circuit primarily consists of a plurality of switching transistors that can be turned on or off individually by a switching controller so that a 3-phase dc power is produced from a single phase dc power, and the 3-phase dc power is provided to the 3-phase dc motor of the scroll compressor.

More specifically, an electronic switching circuit for a 3-phase dc motor normally employs bridge-connected three pairs of switching transistors and one of each paired transistors is connected to the positive terminal of the dc power source and the other to the negative terminal thereof. In order to shut off the motor of the compressor, a switching operation is performed in a manner that only the three transistors connected to the positive terminal of the dc power supply (such transistors are conveniently called "top arm") are turned off, and, at the same time, the other three transistors connected to the negative terminal (such transistors are conveniently called "bottom arm") are kept in the on state. Since the bottom arm transistors are in the on state, the terminals of the stator windings are electrically connected (i.e. short-circuited) with one another through the bottom arm transistors and, therefore, the stator windings form closed-circuit loops. In this case, however, when the motor is shut off to stop the operation of the compressor the bottom arm transistors are subjected to substantially large currents because of the back emf generated in the stator windings, and the bottom arm transistors may consequently damaged. Whereas, use of large capacity switching transistors in order to cope with large amount of currents is uneconomical and impractical.

SUMMARY OF THE INVENTION

In view of the above situation, it is an object of the present invention to provide a method of stopping a scroll compressor that is driven by a 3-phase dc motor in which a reverse revolution of the orbiting scroll can be prevented by using an electronic switching circuit for short-circuiting the stator windings, without an added line switching circuit, but without using large capacity switching transistors or diodes.

Another object of the present invention is to provide a method of stopping a scroll compressor that is driven by a 3-phase dc motor in which an excessive vibratory currents in the electronic switching circuit is suppressed.

A further object of the present invention is to provide a method of stopping a scroll compressor that is driven by a 3-phase dc motor with little generation of acoustic noise.

The scroll compressor used for the present invention has a 3-phase dc motor having 3-phase stator windings (i.e. exciter windings). The motor is energized by a 3-phase dc power that is produced from a dc power source through an electronic switching circuit. The switching circuit has three pairs of bridge-connected switching transistors that can be individually turned on or off by a switching controller. One of each pair of the switching transistors belongs to a first transistor group that is connected to the positive terminal of the dc power source and the other belongs to a second transistor group that is connected to the negative terminal of the dc power source.

In order to achieve the above object, the stopping method of the compressor comprises the steps of simultaneously turning off all of the three pairs of the switching transistors so as to shut off the 3-phase dc power provided to the motor; maintaining all of the three pairs of the switching transistors in the off state for a short time period that is less than one second; simultaneously turning on the switching transistors of the second group at the end of the above mentioned short time period so that all terminals of the 3-phase exciter windings are short-circuited with one another; and maintaining the switching transistors of the second group for a comparatively longer time period that is greater than three seconds while the switching transistors of the first group are still in the off state.

DETAILED DESCRIPTION OF THE PREFERRED EMBODIMENTS

The method of stopping a scroll compressor according to the present invention will now be described in detail with reference to the drawings.

Figure 1:
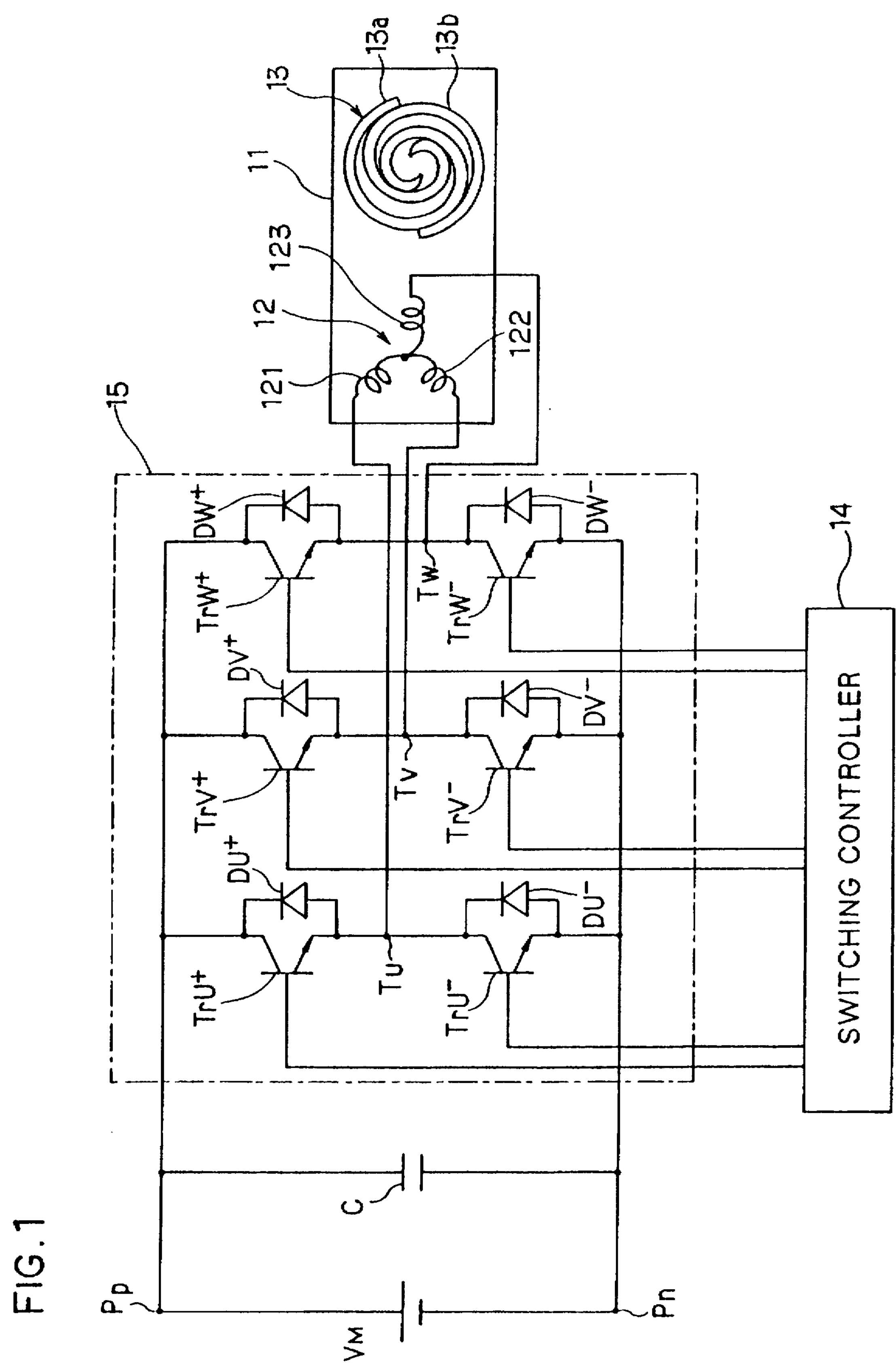
FIG. 1 diagrammatically shows a scroll compressor, a basic circuit diagram for driving and stopping the compressor and a controller therefor that are used for an embodiment of the present invention.

FIG. 1 diagrammatically shows a scroll compressor, a basic circuit diagram for driving and stopping the compressor and a controller therefor that are used for an embodiment of the present invention.

Referring to FIG. 1, a scroll compressor 11 has a 3-phase brushless dc motor 12 and a compressing mechanism 13 that is driven by the motor 12. The motor 12 primarily consists of Y-connected 3-phase stator windings (i.e. exciter windings) 121, 122, 123 and a permanent-magnet rotor (not shown). The compressing mechanism 13 has a stationary scroll 13a and an orbiting scroll 13b that is operatively connected with the rotor of the motor 12. A solid-state switching circuit 15 is an electronic commutation circuit that has three pairs of bridge-connected switching transistors $TrU^+$, $TrV^+$, $TrW^+$, $TrU^-$, $TrV^-$ and $TrW^-$. A switching controller 14 transmits control signals to the switching transistors $TrU^+$~$TrW^-$ individually in order to control the switching operations thereof so that the switching circuit 15 changes a single-phase dc power provided from a dc power source $V_M$ to a 3-phase dc power so as to be provided to the 3-phase dc motor 12. The scroll compressor 11 has no intake valve nor discharge valve before or after the compression mechanism 13 so as to obtain a good compression efficiency.

The three pairs of switching transistors $TrU^+$~$TrW^-$ are separated into two groups: a first group, called "top arm", consisting of the transistors $TrU^+$, $TrV^+$ and $TrW^+$, which are connected to a positive terminal Pp of the dc power source $V_M$, and a second group, called "bottom arm", consisting of the transistors $TrU^-$, $TrV^-$ and $TrW^-$, which are connected to a negative terminal Pn of the dc power source $V_M$.

Diodes DU$^+$, DV$^+$, DW$^+$, DU$^-$, DV$^-$ and DW$^-$ are connected between the emitters and the collectors of the transistors TrU$^+$, TrV$^+$, TrW$^{30}$, TrU$^-$, TrV$^-$ and TrW$^-$, respectively. The diodes DU$^+$~DW$^-$ are provided to return the back currents therethrough to the dc power source $V_m$, which are produced due to back emf generated in the stator windings 121, 122, and 123, when the motor 12 is shut off, or chopping (eliminating bottoms or tops, or both, of the pulse waves) is turned off in a pulse width modulation (PWM). Namely, the diodes DU$^+$~DW$^-$ are provided to protect the transistors TrU$^+$~TrW$^-$ from any damage that may be caused by the back emf. The current rating of the diodes DU$^+$~DW$^-$ is the same as of the transistors TrU$^+$ TrW$^-$.

The bases of the transistors TrU$^+$ TrW$^-$ are individually connected to the switching controller 14. The collectors of the top arm transistors TrU$^+$ TrV$^+$ and TrW$^+$ are jointly connected to the positive terminal Pp of the dc power source VM and the emitters of the bottom arm transistors TrU$^-$ TrV$^-$ and TrW$^-$ are jointly connected to the negative terminal Pn of the dc power source $V_M$. Between the positive and the negative terminals Pp, Pn of the dc power source $V_M$ is connected a ripple filtering capacitor C.

The emitters of the top arm transistors TrU$^+$, TrV$^+$ and TrW$^+$, and the collectors of the bottom arm transistors TrU$^-$, TrV$^-$ and TrW$^-$ are connected with terminals $T_u$, $T_v$ and $T_w$, respectively, of the Y-connected stator windings 121, 122 and 123, respectively.

The switching transistors TrU$^+$~TrW$^-$ are turned on or off by switching control signals transmitted from the switching controller 14 at specific rotor angles. When the compressor 11 is in operation, the single-phase dc power provided from the power source $V_M$ is changed to 3-phase dc power (phases U, V, W) by the switching circuit 15 and the three phases of the dc power are individually provided to the stator windings 121, 122 and 123 through the terminals $T_u$, $T_v$ and $_T$w, respectively. Then, the motor 12 is driven and the orbiting scroll 13b, which is operatively connected with the rotor of the motor 12, of the compressing mechanism 13 is driven by the motor 12 to make an orbital motion. The switching sequence of the switching circuit 15 is controlled by the switching controller 14 so as to cause the stator windings to produce a rotating magnetic flux in the air gap between the stator and the rotor. The rotating magnetic flux interacts with the magnetic flux produced by permanent magnets in the rotor so that the rotor rotates in synchronism with the rotating magnetic flux.

The above described method of driving a 3-phase brushless dc motor is a widely known prior art and this driving method per se is not the present invention. The method of stopping a scroll compressor according to the present invention will now be explained below.

First, the gist of the stopping method is as follows:

When the operation of the compressor 11 is to be stopped by turning off the motor 12, the switching controller 14 transmits control signals to the bases of the transistors TrU$^+$~TrW$^-$ in a manner that all of the six transistors TrU$^+$~TrW$^-$ are turned off simultaneously and kept in the off state for a short period of time. Then, while the top arm transistors TrU$^+$, TrV$^+$ and TrW$^+$ are still in the off state, only the bottom arm transistors TrU$^-$, TrV$^-$ and TrW$^-$ are turned on and kept in the on state for more than a predetermined time period.

Figure 2:
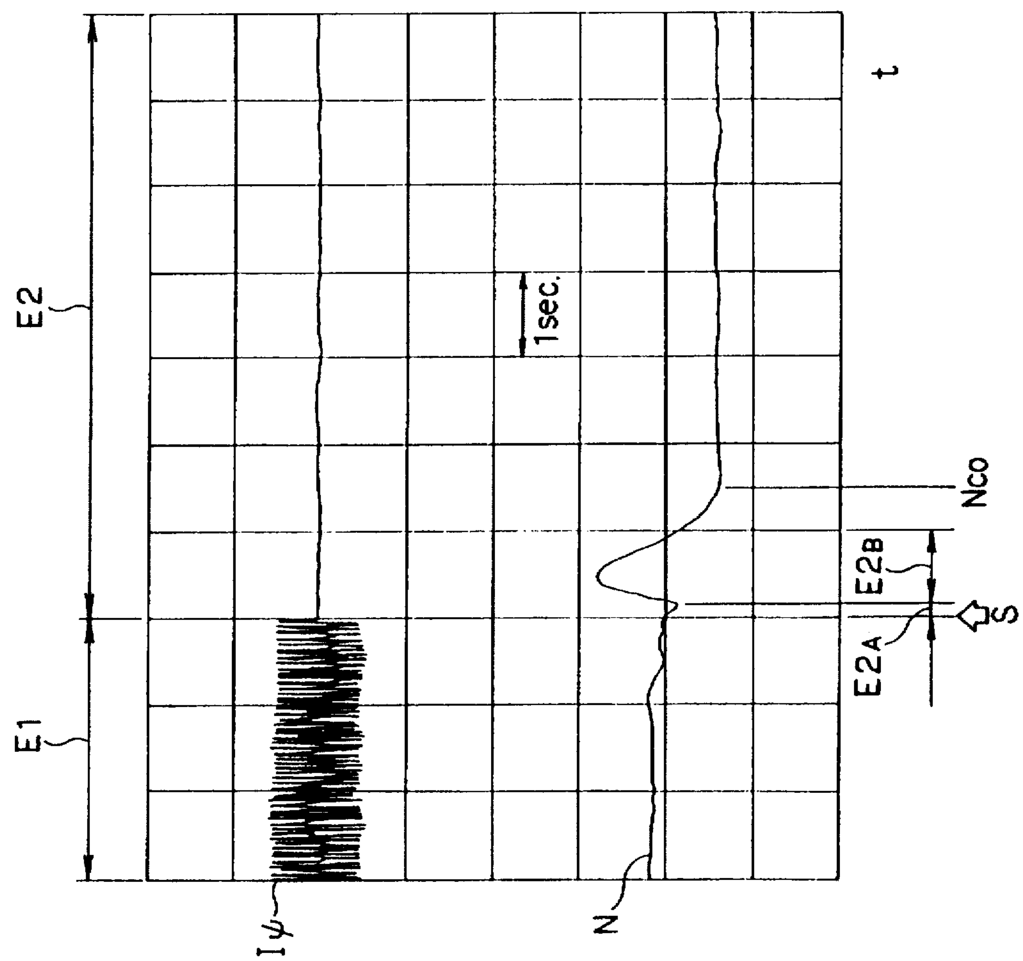
FIG. 2 is a graph showing the amount of motor current and the total acoustic noise level which is the sum of the noise generated from the compressor and the background noise with respect to elapsed time, before and after the operation of the compressor is stopped without using the method of the present invention.

FIG. 2 is a graph showing the amount of motor current (Iψ) and acoustic noise level (N) which is the sum of the noise generated from the compressor 11 and the background noise with respect to elapsed time (t), before and after all of the six transistors TrU$^+$~TrW$^-$ used in the switching circuit 15 shown in FIG. 1 are simultaneously turned off and kept in the off state in order to stop the operation of the compressor 11. The motor phase current (Iψ) shown in the graph is of one of the three phase currents provided to the motor 12. This graph is provided for explanation and comparison purposes and the phase current and the noise level shown in this graph do not represent those when the present invention is practiced.

In FIG. 2, one grid-line interval of the time axis represents one second, the time period E1 represents the time period during which the compressor 11 is in the normal operating state, the time indicated by the arrow with letter S represents the moment when all of the six transistors TrU$^+$~TrW$^-$ are simultaneously turned off, and the time period E2 represents the time period during which all of the six transistors TrU$^+$~TrW$^-$ are kept in the off state.

Immediately after time S, when the six transistors TrU$^+$~TrW$^-$ are turned off, the phase current (Iψ) becomes zero immediately. The acoustic noise level (N) momentarily dips for a very short time period $E2_A$ after time S, but thereafter substantially increases during a time period $E2_B$. The time denoted by "$N_{co}$", which is about 1.5 seconds after time S in FIG. 2, represents the time when the noise of the backflowing high pressure gas and of the compressor becomes zero, and the noise level (N) thereafter represents that of the background noise only.

The initial short time period $E2_A$ represents the time period from time S, when the power supply to the motor 12 is shut off, until the time when the orbiting scroll 13b of the compressing mechanism 13 is about start a reverse revolution. In other words, during this short time period $E2_A$, the orbiting scroll 13b does not make a reverse revolution and, therefore, the acoustic noise level (N) is momentarily lowered.

As mentioned above, the high pressure gas discharged from the compressor 11 backflows into the compressor 11 as soon as the operation of the compressor is stopped. This backflowing high pressure gas forces the orbiting scroll 13b to make a reverse revolution. The backflowing high pressure gas and the orbiting scroll 13b in the reverse revolution together produce a substantially high level noise. The time period $E2_B$ in FIG. 2 represents the time period during which the noise level is substantially increased because of the reverse revolution of the orbiting scroll 13b. As the reverse revolution of the orbiting scroll 13b ends at time $N_{co}$, the noise generation from the compressor 11 will also cease.

Figure 3:
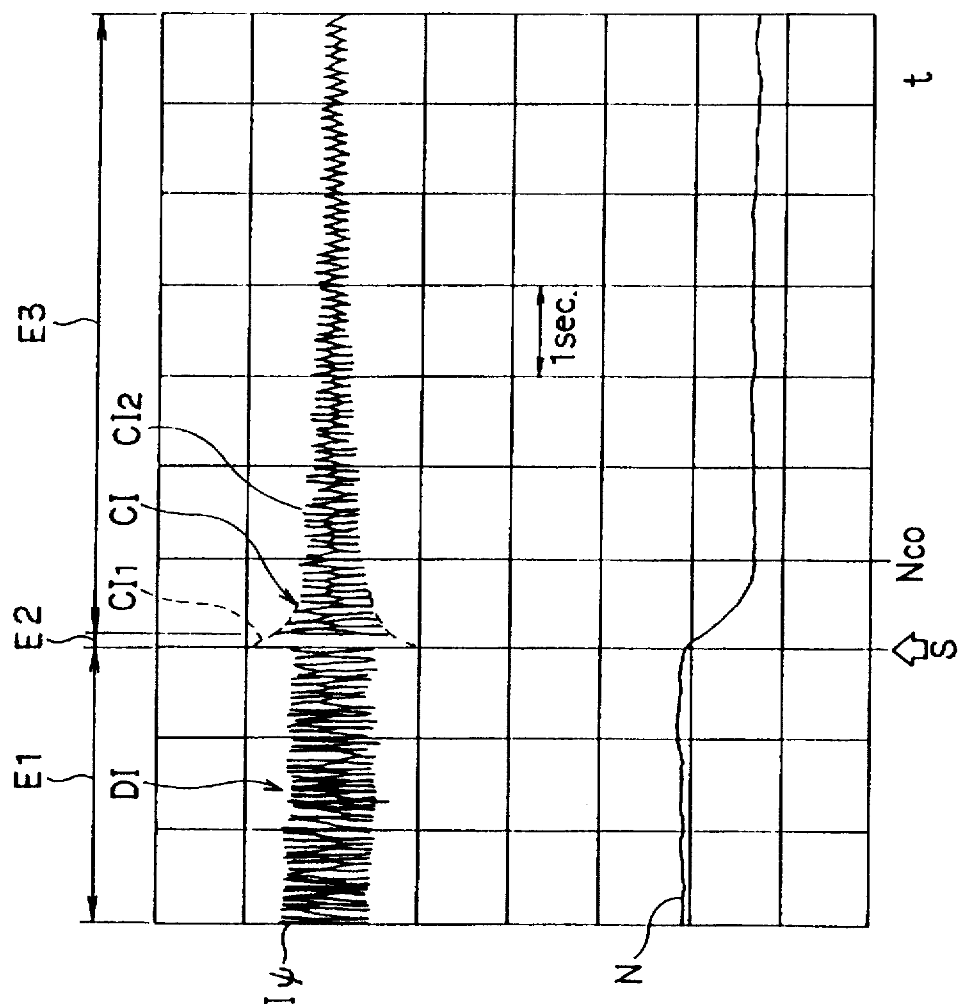
FIG. 3 is a graph showing the amount of motor current and the total acoustic noise level which is the sum of the noise generated from the compressor and the background noise with respect to elapsed time, before and after the operation of the compressor is stopped using the method of the present invention.

FIG. 3 is a graph showing the amount of motor current (Iψ) and acoustic noise level (N) which is the sum of the noise generated from the compressor 11 and the background noise with respect to elapsed time (t), before and after all of the six transistors TrU$^+$~TrW$^-$ used in the switching circuit 15 shown in FIG. 1 are simultaneously turned off in order to stop the operation of the compressor 11. The motor phase current (Iψ) shown in the graph is of one of the three phase currents provided to the motor 12 and the time of turning all of the transistors off is denoted by the arrow with letter S, as in the case shown in FIG. 2. In this case, however, the switching operation to the transistors after time S is different from that shown in FIG. 2.

In FIG. 3, the time period E1 represents the time period during which the compressor 11 is in a normal operating state. The motor current (Iψ) during this time period E1 represents the motor driving current (DI). In the present invention, as opposed to the case shown in FIG. 2, all of the six transistors TrU$^{30}$~TrW$^-$ are kept in the off state only for a short time period E2 after simultaneously turned off at time S. The time period E2 in FIG. 3 is a very short period, which is less than one second, more specifically, a few hundred milliseconds. The time period E2 in FIG. 3 corresponds to the period $E2_A$ in FIG. 2. In other words, at the end of time period E2in FIG. 3 the orbiting scroll 13b is about to start reverse revolution, and the orbiting scroll 13b would make reverse revolution if the switching control according to the present invention, which will be described below, were not practiced.

Reference is now made to FIG. 3 together with FIG. 1. According to the present invention, at the end of the time period E2, only the bottom arm transistors $TrU^-$, $TrV^-$ and $TrW^-$, which are connected to the negative terminal Pn of the dc power source $V^M$, are simultaneously turned on, while, at the same time, the top arm transistors $TrU^+$, $TrV^{30}$ and $TrW^+$, which are connected to the positive terminal Pp of the dc power source VM, are continuously kept in the off state. The time period E3in FIG. 3 represents the time period during which the top arm transistors are kept in the off state and, at the same time, the bottom arm transistors are kept in the on state.

At time S, if all the top arm transistors $TrU^+$, $TrV^+$, $TrW^+$ are simultaneously turned off in order to stop the compressor 11, and, at the same time, if all of the bottom arm transistors $TrU^-$, $TrV^-$, $TrW^-$ are simultaneously turned on, the stator winding terminals $T_u$, $T_v$, $T_w$ will be short circuited one another through the bottom arm transistors and, therefore, there will be a braking effect of the rotor of the motor 12 and the orbiting scroll 13b connected therewith, as mentioned above. However, in such case, excessive vibratory currents caused by the back emf generated in the stator windings will flow through the bottom arm transistors $TrU^-$, $TrV^-$, $TrW^-$ and the diodes $DU^-$, $DV^-$, $DW^-$, respectively connected thereto, as shown in broken lines denoted by "$CI_1$" in FIG. 3. The back emf generated in the stator windings is caused by angular vibration of the rotor of the motor 12 and the orbiting scroll 13b that is operatively connected with the rotor. One of the objects of the present invention is to suppress such excessive vibratory currents immediately after the stopping operation of the compressor. In the stopping method of the compressor 11 of the present invention, all of the six transistors $TrU^+$~$TrW^-$ are simultaneously turned off at time S. As mentioned above in reference to FIG. 2, if the compressor 11 is stopped by simultaneously turning off all of the six transistors $TrU^+$~$TrW^-$ no vibratory current will flow. In the present invention, all of the six transistors $TrU^+$~$TrW^-$ are kept in the off state for a very short time period until the time the orbiting scroll 13b is about to start reverse revolution. Referring to FIG. 2, the time period $E2_A$ represents the period within which the orbiting scroll 13b has not yet started reverse revolution and, therefore, the substantial noise increase shown in FIG. 2 has not yet occurred. In other words, the reverse revolution of the orbiting scroll 13b and the substantial noise increase start concurrently at the end of the time period $E2_A$.

Referring to FIGS. 1 and 3, in the present invention, the bottom arm transistors $TrU^{-}$ $^{TrV-}$ and $TrW^-$ are simultaneously turned on at the end of the time period E2, when the orbiting scroll is about to start reverse revolution and the noise increase would therefore occur, while the top arm transistors $TrU^+$, $TrV^+$and $TrW^+$ are still kept in the off state. As mentioned above, when the bottom arm transistors $TrU^-$, $TrV^-$ and $TrW^-$ are kept in the on state, the winding terminals Tu, Tu, and Tw are short-circuited with one another through the bottom arm transistors $TrU^-$, $TrV^-$ and $TrW^-$ and the diodes DU_, DV_ and DW_ connected respectively thereto, and, consequently, the rotor of the motor 12 and the orbiting scroll 13b receive a braking effect. Thus, the orbiting scroll 13b will be kept from making a reverse revolution, and the noise generation from the reverse revolution of the orbiting scroll 13b will also be prevented. Namely, according to the stopping method of the scroll compressor 11 of the present invention, not only excessive vibratory currents immediately after the motor 12 is turned off can be eliminated but also reverse revolution of the orbiting scroll 13b and noise generation therefrom can be prevented.

Referring to FIG. 3, since the top arm transistors $TrU^+$, $TrV^+$ and $TrW^+$ are kept in the off state during the time periods E2 and E3, no drive current is provided to the 3-phase motor 12, thus, the motor 12 is not in operation, but the rotor of the motor 12 will be prevented from turning freely because of the braking effect mentioned above.

Namely, in the case of the present invention shown in FIG. 3, unlike the case shown in FIG. 2, a vibratory current (CI) exists during the time period E3 as the phase current (Iψ), but of smaller and further decreasing amplitude as denoted by "$CI_2$". However, since the stator windings 121, 122 and 123 are short-circuited with one another the rotor of the motor 12 is prevented from rotating freely when the orbiting scroll 13b tends to make reverse revolution due to the backflow of the high pressure gas after the compressor operation is stopped. In this case, the orbiting scroll 13b will instead make an angularly vibratory motion with a small angular amplitude. This angularly vibratory motion of the orbiting scroll 13b will be transmitted to the rotor of the motor 12, causing generation of the vibratory current $CI_2$ as shown in FIG. 3. Since the orbiting scroll 13b does not make a reverse revolution because of the braking effect, no increased acoustic noise, as shown in FIG. 2, will generate. The amount of the vibratory current CI produced by the angularly vibratory motion of the rotor would be at its maximum immediately after the operation of the compressor 11 is stopped. The vibatory current CI gradually decreases as the time (t) passes as shown in FIG. 3. If the excessively large amount of vibratory current, as indicated by "$CI_1$ " in FIG. 3, flows through the bottom arm transistors $TrU^-$ $TrV^-$ and $TrW^-$, the bottom arm transistors may be damaged. Because of this reason, it is an effective drive control means to turn off all of the six transistors $TrU^+TrW^-$ only for the very short time period E2, during which the vibratory current ($CI_1$) would be excessively large.

Figure 4:
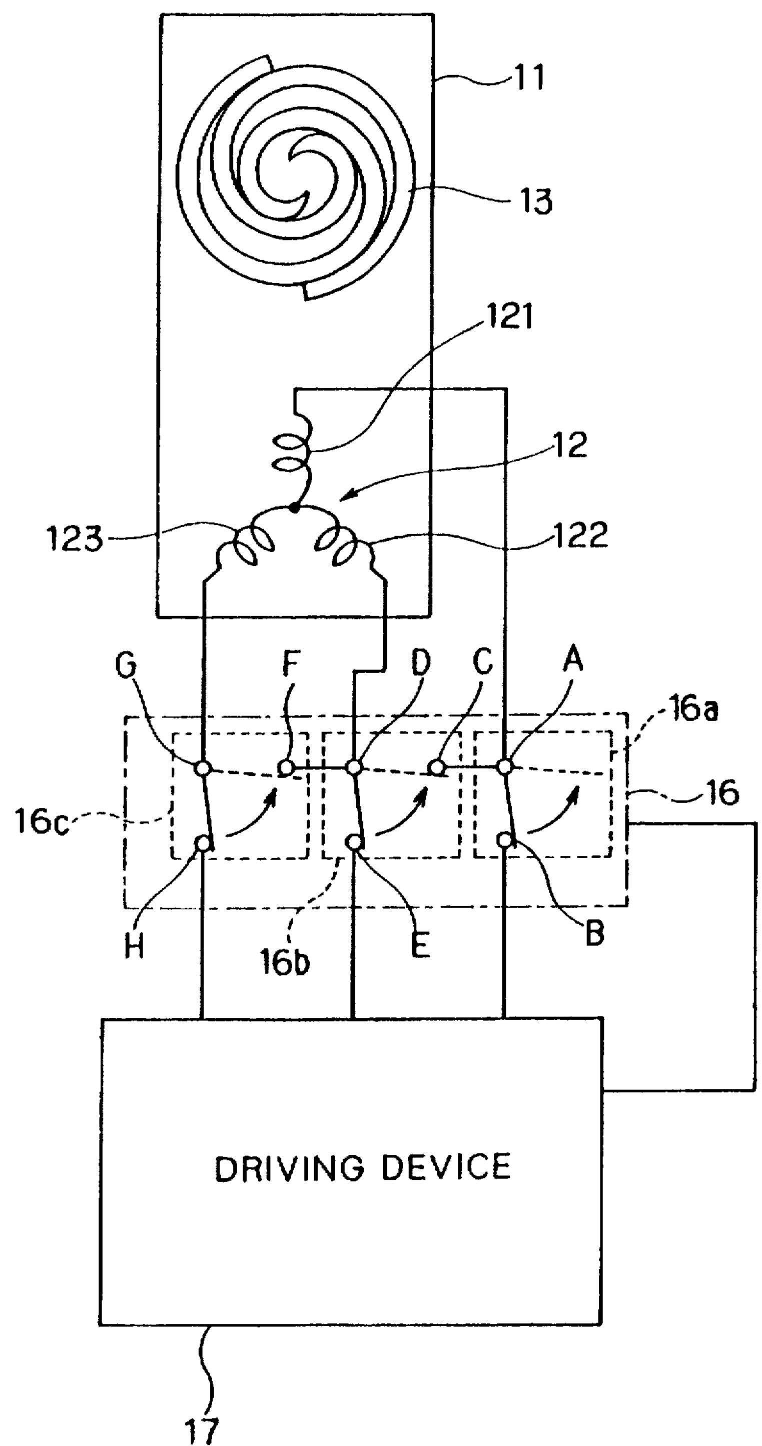
FIG. 4 shows a prior known driving device and a line switching circuit for driving and stopping a scroll compressor that is driven by a 3-phase dc motor.

As mentioned above, the transistors can be prevented from being damaged by keeping all of the six transistors $TrU^+$~$TrW^-$ in the off state during the short period of time after the operation of the compressor 11 is stopped until the time when the orbiting scroll 13b is about to start reverse revolution, and, thereafter, simultaneously turning on only the bottom arm transistors $TrU^-$, $TrV^-$, $TrW^-$ and keeping the bottom arm transistors in the on state until the time when amount of the vibratory current ($CI_2$) produced by the vibration of the rotor becomes small enough while the top arm transistors $TrU^+$, $TrV^+$, $TrW^+$ are still kept in the off state. The suppression of the acoustic noise and the vibration of the orbiting scroll can be achieved in the method of the present invention, as in the case of the prior known line switching method described in reference to FIG. 4.

EFFECT OF THE PRESENT INVENTION

The driving method of the scroll compressor according to the present invention involves driving of the compressor by a 3-phase dc motor on a 3-phase dc power provided from a dc power source through an electronic switching circuit having three pairs of switching transistors. Half of the transistors, called "top arm", are connected to the positive terminal of the dc power source and the other half, called "bottom arm", to the negative terminal thereof. The switchings of the transistors are individually controlled by a switching controller.

When the operation of the compressor is stopped by stopping the dc motor, the switching transistors can be prevented from being damaged by excessive back emf currents by keeping all of the transistors in the off state for a short period of time after the compressor (or motor) is turned off and, thereafter, turning on and keeping only the bottom arm transistors in the off state for more than a predetermined time period while the top arm transistors are still kept in the off state. Furthermore, reverse revolution of the orbiting scroll of the compressor is also prevented by this method. This method also substantially suppresses the noise generation from the compressor. As a result, the compressor need not be equipped with any check valves to prevent the backflow of the compressed gas, and the motor drive circuit needs no additional line switching circuit as the one shown in FIG. 4. In addition, the stopping method of the compressor (or motor) of the present invention requires, from the hardware point of view, only a conventional type electronic switching circuit and a switching controller. The method of the present invention, therefore, is effective and easily practicable with little additional cost as compared with conventional compressor driving method.

It should also be understood that various changes and modifications may be made in the above described embodiments which provide the characteristics of the present invention without departing from the spirit and principle thereof particularly as defined in the following claims.

What is claimed is:

1. A method of stopping a scroll compressor that is driven by a 3-phase dc motor having 3-phase exciter windings, the motor being energized by a 3-phase dc power that is produced from a dc power source through an electronic switching circuit, the switching circuit having three pairs of bridge-connected switching transistors whose switchings are individually controlled by a switching controller, one of each pair of the switching transistors belonging to a first transistor group that is connected to a positive terminal of the dc power source and the other belonging to a second transistor group that is connected to a negative terminal of the dc power source, the method comprising the steps of:

(a) simultaneously turning off all of the three pairs of the switching transistors so as to shut off the 3-phase dc power provided to the motor;

(b) maintaining all of the three pairs of the switching transistors in the off state for a first time period;

(c) simultaneously turning on the switching transistors of the second group at the end of said first time period so that all terminals of the 3-phase exciter windings are short-circuited with one another; and (d) maintaining the switching transistors of the second group for a second time period while the switching transistors of the first group are still in the off state.

2. A method of stopping a scroll compressor according to claim 1, wherein said first time period is less than one second and said second time period is greater than three seconds.

3. A method of stopping a scroll compressor according to claim 1, wherein said scroll compressor has an orbitally movable scroll and the length of said first time period is determined in a manner that at the end of said first time period the movable scroll is about to start a reverse orbital motion because of a backflow of a compressed fluid into the compressor.

* * * * *